United States Patent [19]

Hanada et al.

[11] Patent Number: 4,689,800
[45] Date of Patent: Aug. 25, 1987

[54] METHOD OF MELTING RAW MATERIAL WITH AN ELECTRIC ARC FURNACE

[75] Inventors: Shigeru Hanada, Kagamihara; Etsuo Inagaki, Nagoya; Hiroya Nakata, Chita, all of Japan

[73] Assignee: Daidotokushuko Kabushikikaisha, Japan

[21] Appl. No.: 808,126

[22] Filed: Dec. 12, 1985

[30] Foreign Application Priority Data

Dec. 13, 1984 [JP] Japan ............................ 59-263287

[51] Int. Cl.$^4$ .......................................... H05B 7/148
[52] U.S. Cl. ................................................ 373/104
[58] Field of Search ............ 373/49, 50, 102, 104, 373/105, 106

[56] References Cited

U.S. PATENT DOCUMENTS

| 2,976,453 | 3/1961 | Lünig | 373/105 |
| 3,217,205 | 11/1965 | Bennett | 373/105 |
| 3,435,121 | 3/1969 | Jackson | 373/105 |
| 4,607,374 | 8/1986 | Inagaki et al. | 373/104 |

Primary Examiner—Roy N. Envall, Jr.
Attorney, Agent, or Firm—William A. Drucker

[57] ABSTRACT

A method of operating an electric arc furnace is disclosed by which an arc electrode provided in an electric arc furnace is supplied with electric power, an electric arc is extended from the arc electrode and raw material in the electric arc furnace is molten by the arc. Before operation of the electric arc furnace, an electric current I satisfying an equation $$d[Pi/(Pi-Pl-qI)]dI = 0$$

is first calculated where Pi is the secondary output of the used arc furnace transformer. Pl is the total ohmic loss of the secondary winding of the transformer and of an electric circuit connecting the secondary of the transformer with the arc electrode, ql is the heat loss of the used electric arc furnace and I is the electric current flowing from the secondary of the transformer to the arc electrode. Next, when electric power is really supplied to the arc electrode from the arc furnace transformer to operate the electric arc furnace, the beforehand obtained electric current is supplied to the arc electrode from the transformer. As a result, the specific electric power consumption can be minimized.

1 Claim, 3 Drawing Figures

METHOD OF MELTING RAW MATERIAL WITH AN ELECTRIC ARC FURNACE

BACKGROUND OF THE INVENTION

1. Field of the Invention

This invention relates to a method of operating an electric arc furnace in which various raw materials are melted.

2. Description of the Prior Art

In an electric arc furnace, an electric arc is extended from an arc electrode by supplying it with electric power from an arc furnace transformer and metallic raw materials are melted by the heat due to the electric arc. At present, in companies which operate furnaces of this kind, melting conditions are determined by the following steps and the melting operation is put into practice under the following conditions. First when raw material to be molten is provided, a time internal necessary for melting the raw material is determined on the basis of past experience. The electric power which must be provided to the electric arc furnace in order to melt the raw material in the determined time interval is then determined. An electric arc current level necessary to supply the electric power is further calculated. The melting operation is performed with the calculated current level. Consequently, if factors such as the kind and quantity of the raw material are changed or the time interval for melting is varied, the input electric power and accordingly the electric arc current level are changed.

Under these circumstances, when the specific electric power consumption, defined as the electric energy consumed per unit mass of raw material to be melted, is considered, such power consumption has ultimately been determined in connection with the kind of the raw material and the time interval for melting.

Applicants have provided a method for melting by which the specific electric power consumption is held down to the minimum value and electric power can be saved.

SUMMARY OF THE INVENTION

A first object of the present invention is to provide a method by which electric power is supplied to an arc electrode provided in an electric arc furnace from an arc furnace transformer. An electric arc is generated in the furnace and the raw material charged into the furnace is melted due to the heat of the electric arc, a molten metal pool being formed.

A second object of the present invention is to provide a method by which, even though the kind of the raw material changes, that is, whatever kind of raw material may be melted, the raw material can be melted with a minimized value of the specific electric power consumption.

According to the present invention, when an arc furnace transformer, an electric arc furnace and an electric circuit connecting them are chosen, factors characteristic of these equipments are first determined and an electric arc current minimizing the specific electric power consumption is then obtained by calculation on the basis of these factors. Namely the secondary current I of the transformer is determined beforehand so that it satisfies an equation $$d[Pi/(Pi-PL-qL)]/dI=0$$

where Pi is the secondary output of the arc furnace transformer, PL is the total ohmic loss of the secondary winding of the transformer and of the circuit connecting the arc electrode with the secondary winding and qL is the heat loss of the furnace.

Next, when the raw material is melted with use of the transformer and the electric arc furnace, the predetermined current I is supplied to the arc electrode from the secondary of the transformer, regardless of the kind of the raw material involved, the electric arc is extended from the arc electrode and the raw material in the electric arc furnace is melted by the arc. As a result, whatever the kind of the raw material may be, i.e., regardless of the kind of raw material, it can be melted with the minimum amount of specific electric power consumption, the molten metal pool being efficiently obtained.

The above mentioned point is further explained. In the present invention, if such equipment and devices as the arc furnace 6, the arc furnace transformer 4 and the electric circuit 9 are selected, the factors such as the secondary output power Pi of the arc furnace transformer 4, the total ohmic loss PL and the heat loss qL appropriate therefor are obtained. On the basis of these factors, the current I to be fed to the arc electrode 7 of the arc furnace is determined. Obtaining of the factors and the determination of the current can be carried out before the equipment and devices are operated to melt the raw materials at a commercial rate.

Next, when the above mentioned equipment and devices are operated at a commercial rate, the raw materials are melted with the prescribed current I flowing through the arc electrode 7. Thus, the melting of the raw materials at a commercial rate can be carried out with the minimum specific electric power consumption. In this case, since the current obtained in the aforementioned manner using the factors proper to the equipment and devices is used, the problem in the prior art can be resolved.

Namely, in the prior art, raw materials to be melted are first determined and then the electric power known empirically is selected and the raw materials are melted, as mentioned hereinabove. Consequently, the specific electric power consumption is varied for each kind of raw material. Namely, the specific electric power consumption may be smaller for one raw material but larger for another raw material.

On the contrary, since the current is determined using the factors appropriate to the equipment and devices in the present invention, the raw materials can always be melted with the minimum specific electric power consumption.

Other objects and advantages of the invention will become apparent during the following discussion of the accompanying drawings.

DESCRIPTION OF THE PREFERRED EMBODIMENTS

Figure 1:
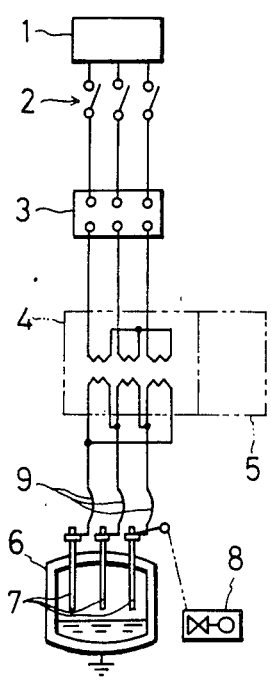
FIG. 1 is a view showing a system for supplying electric power to an electric arc furnace.

Now a general process is explained in which raw material is melted with use of a general electric arc furnace and associated equipments. In FIG. 1, electric power is supplied to the primary of an arc furnace transformer 4 from a high voltage or extra-high voltage power supply 1 through a disconnecting switch 2 and a circuit breaker 3. The arc furnace transformer 4 is provided with a tap changer 5 and the output voltage at the secondary of the transformer is adapted to be adjustable. The secondary output of the arc furnace transformer 4 is supplied to arc electrodes 7 in an electric arc furnace 6. A numeral 9 denotes an electric circuit connecting the secondary of the transformer 4 with the arc electrode 7.

When the electric arc furnace 6 is operated to melt raw material, an original charge into the furnace of raw material to be melted (scrap) is first performed. After the charge is finished, electric power is supplied to the arc electrodes 7 from the arc furnace transformer 4 through the electric circuit 9, an electric arc is struck and developed, as is well known, and the melting of the raw material is started. In this situation, the raw material is melted in the furnace by the heat due to the arc at high temperature in well known manner. As the melting of the raw material proceeds and the raw material is gradually transformed into a molten metal pool, the volume of the raw material is decreased therefore the electric arc is interrupted temporarily during melting period, with additional raw material being charged. The addition charged raw material is melted in the same manner as above described. After the melting of all the raw material has been completed and the raw material has been fully transformed into the molten metal pool, a next process of well known refining takes place. In this refining period, oxygen-blowing, and slag-removing are carried out as is generally known. After the refining is finished, tapping is done. What is above described is the general process of melting.

Next, when the above mentioned melting of raw material is to be performed, the value of the electric current to be supplied to the arc electrodes 7 is first estimated in the following way by a calculation based on various factors characteristic of the transformer 4, the electric arc furnace 6 and the electric circuit 9 connecting them. Namely, the secondary electric current I of the transformer flowing to the arc electrode from the secondary of the transformer is determined by an equation $$d[Pi/(Pi-PL-qL)]/dI=0$$

where Pi is the secondary output of the arc furnace transformer, PL is the total ohmic loss of the secondary winding of the transformer and of the electric circuit connecting the secondary winding with the arc electrode, and qL is the thermal loss of the furnace. This equation can be solved by manual calculation but more easily by numerical calculation with an electronic computer as is described hereinafter.

The secondary output power Pi of the arc furnace transformer 4 is given as the product of the output voltage of the secondary winding of the arc furnace transformer and the secondary current (arc current) of the arc furnace transformer 4 flowing into the arc electrode 7 of the arc furnace 6 from the winding and the unit of Pi is the watt.

The total ohmic loss PL is given as the square of the secondary current of the transformer multiplied by the sum of the resistance of the secondary winding and the resistance of the electric circuit 9 and the unit of Pi is the watt as well.

The heat loss qL is the energy flow lost from the body of the arc furnace 6 in the form of heat and the unit qL is the watt.

The heat loss qL is taken as a constant which is appropriate to the arc furnace 6 used for melting raw materials.

The heat loss qL is measured as follows: The heat loss qL is, in ordinary circumstances, obtained as the sum of the thermal loss q1 dissipated by the furnace body, the heat loss q2 due to the cooling of the furnace body and the heat loss q3 due to the exhaust of gases from the arc furnace.

The heat loss q1 can be obtained by measuring the temperature on the surface of the furnace body and by using the measured temperature and the known surface area of the furnace body.

The heat loss q2 is obtained by measuring the flow rate of the water used for cooling the furnace body and the difference between the temperatures of the cooling water at the inlet and the outlet of the conduit for the cooling water.

The heat loss q3 is obtained by measuring the temperature and flow rate of the exhaust gas at the outlet for the gas from the furnace body. The flow rate of the gas is usually calculated from the speed of the gas (measured with a Pitot tube) and the sectional area of the outlet for the gas.

As mentioned above, the heat loss qL is obtained by measuring the heat losses q1, q2 and q3 separately and summing them up. The above mentioned measurements of q1, q2 and q3 are known as in items 5.7, 5.8 and 5.9 in ENERGY BALANCE MEASUREMENTS FOR AN ELECTRIC ARC STEELMAKING FURNACE, 10th Congress, June 18-22, 1984, Stockholm, Sweden.

The surface temperature of the furnace body 6 related to the heat loss q1, the difference between the temperatures of the cooling water related to the heat loss q2 and the temperature and flow rate of the exhaust gas related to the heat loss q3 can be measured by charging tentatively some raw material into the arc furnace and melting the raw material as an experiment, with the that released from the arc electrodes.

Next, when an electric current is supplied to the arc electrode to melt the raw material in the furnace as aforementioned, the electric current supplied from the secondary of the transformer to the arc electrode is controlled so that it agrees with the electric current obtained as the solution to the above mentioned equation. The control is done by exchanging the taps of the arc furnace transformer 4 or by lifting and lowering the arc electrodes 7 with an electrodes positioning device 8 in the electric arc furnace 6 to change the length of the electric arc while measuring, at the same time, the electric current flowing from the secondary of the transformer to the arc electrode with a well known measuring instrument. When the electric arc furnace is operated with the electric current controlled in this way, the electric power consumption in the aforementioned melting process is lowered and the specific electric power consumption can be kept to a minimum.

A further explanation is now provided. When the raw materials are melted in the arc furnace 6, the voltage applied to the arc electrode 7 from the secondary winding of the arc transformer 4 is determined by selecting one of the voltage taps of the transformer. When the arc furnace is operated in a usual manner, the normally used tap is fixed. In a melting period, the tap for the highest voltage is used. On the other hand, the current flowing to the arc electrode from the secondary winding takes the value as determined in the aforementioned manner. This value of the current is set in the electrode regulator 8 for the arc furnace and the electrode regulator raises or lowers the arc electrode so that the current flowing into the arc electrode may be equal to the set value of the current. After one of the taps is selected and the reference value of the current is set, the raw materials are melted in the arc furnace under these conditions. When the arc electrode is controlled to be raised or lowered, in a melting process, the arc current is varied and take instantaneously a smaller or a larger value than the set value of the current. However, an average value of the current taken over a time interval (t) is equal to the such value as determined in the aforementioned manner.

Figure 2:
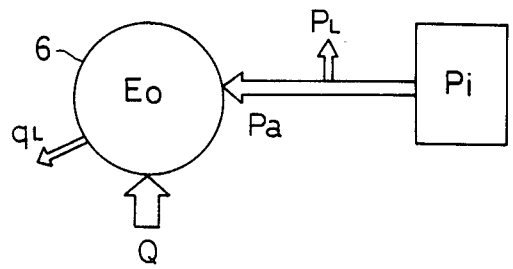
FIG. 2 is a view showing a heat consumption model for the electric arc furnace.

It will now theoretically explained how the electric current satisfies the aforementioned equation $$d[Pi/(Pi-PL-qL)]/dI=0$$

to provide the minimum the specific electric power consumption. The heat consumption model of the electric arc furnace is as shown in FIG. 2. In this figure, Eo is the heat held by materials in the furnace, Pi is the secondary output of the arc furnace transformer 4, PL is the total ohmic loss of the secondary winding of the transformer and the electric circuit 9, Pa is the heat brought into the furnace in the form of heat due to the electric arc and Q is the thermal input into the electric arc furnace not in the form of electric power but by oxygen-blowing or an auxiliary oil burner. qL is the heat loss from the furnace body. A relation in a time $\Delta t$ among the above mentioned quantities is expressed by $$\Delta Eo = Pi \cdot \Delta t + \Delta Q - (PL + qL)\Delta t. \quad (1)$$

If the time from the start to the end of melting is t, the relation (1) becomes $$Eo = Pi \cdot t + Q - (PL + qL)t. \quad (2)$$

Equation (2) is solved for t as $$t = (Eo - Q)/(Pi - PL - qL). \quad (3)$$

On the other hand, since the specific electric power consumption is, from its definition, electric energy input per unit mass of charged raw material, the specific electric power consumption W is related with the charged mass M by $$W = Pi \cdot t / M. \quad (4)$$

By replacing t in eq. (4) with eq. (3), eq. (4) becomes $$W = Pi \cdot (Eo - Q)/\{M(Pi - PL - qL)\} \quad (5)$$

Since Eo, Q, M, qL in eq. (5) are independent of the electric current I flowing from the secondary of the arc furnace transformer to the arc electrode while Pi and PL are functions of the electric current I, it is sufficient to minimize $Pi/(Pi-PL-qL)$ in order to minimize W. This quantity $Pi/(Pi-PL-qL)$ is represented by a curve of the secondary degree is a result of calculation. Consequently, the minimum electric current I is given by putting the derivative of $Pi/(Pi-PL-qL)$ equal to zero and is hence determined as the electric current satisfying an equation $$d[Pi/(Pi-PL-qL)]/dI=0. \quad (6)$$

When the electric arc furnace is operated with this electric current I, the specific electric power consumption can be minimized.

Next, when the electric current minimizing the specific electric power consumption is sought, it may be determined by calculating directly the relation between the specific electric power consumption W and the electric current I with eq.(5) and finding the value of I satisfying eq.(6). In this case, since Q is the reaction heat of oxygen at the time of oxygen-blowing, such value can be determined by the operating conditions of the furnace. The furnace heat loss qL can also be determined by heat balance and measured data. With the short circuit resistance ro or the electric arc furnace, the ohmic loss PL is further expressed by $$PL = 3I^2 \cdot ro$$

and ro can be measured in the short circuit test of the electric arc furnace. It is also known that Pi is expressed by $$Pi = 3V_{20} \cdot I \cdot Pf_2$$

with $$Pf_2 = \sqrt{1 - [(I \cdot Xs/V_{20}) \cdot R_F]^2}$$

$$V_{20} = \sqrt{(V_1/3)^2 - I^2 \cdot R_F^2[(X_T + Xs)^2 - Xs^2]}$$

$$R_F = \alpha/(I/Is)^2 + 1 - \alpha$$

where $\alpha$ is a numerical factor, Is is the short circuit current, I is the operating current, V1 is the primary voltage of the transformer, $X_T$ is the reactance of the transformer, Xs is the short circuit reactance, $V_{20}$ is the secondary voltage of the transformer, $Pf_2$ is the power factor and $R_F$ is the reactance factor. Accordingly, eq.(5) can be numerically calculated by making use of, for example, an electronic computer with the above mentioned various values related to the electric arc furnace and arc furnace transformer being used in furnace operation and consequently, the relation between the concrete value of the electric current I and that of the specific electric power consumption W can be obtained. On the basis of the obtained relation, the electric current I minimizing the specific electric power consumption W can be selected.

Figure 3:
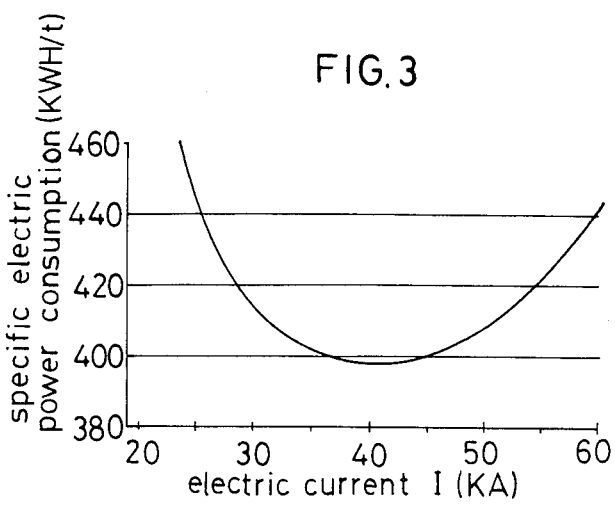
FIGS. 3 and 4 are graphs showing examples of the relation between the electric current and the specific electric power consumption.

Next, that relation between the electric current I and the specific electric power consumption W which has thus been obtained by performing the aforementioned numerical calculation concerning a real electric arc furnace and a real arc furnace transformer is shown in FIG. 3. The data on the electric arc furnace, the arc furnace transformer and so on are as follows:

weight of the molten metal pool; 82.3t weight of slag; 6.8t,
flow rate of blown oxygen; 8.5 m³N/t,
thermal efficiency in melting process; 0.83,
heat loss of furnace qL; 4.75MW
heating time; 75 min.,
ro; 0.852 mΩ,
V₁; 610 V,
Xs; 3.43 mΩ,
α; 0.1,
Is; 99.7 KA, and
XT; 0.509 mΩ.

It is found from the result shown in FIG. 3 that the specific electric power consumption W is the minimum with the electric current I of 40 KA and the minimum value of W is 398.2 KWH/t.

Figure 4:
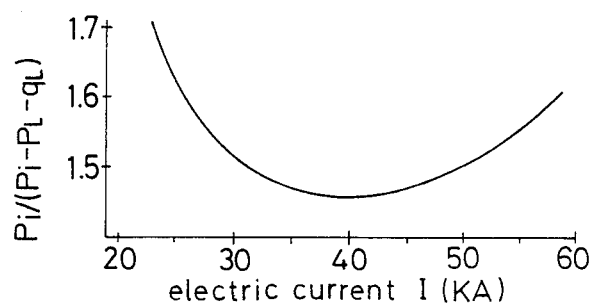

Next, FIG. 4 shows the result which has been obtained by calculating eq.(5) with the factor (Eo-Q)/M dropped out as a mere numerical factor independent of the electric current I. It is known as well from the result shown in this figure that the specific electric power consumption is at a minimum when the electric current I is 40 KA similarly as in the case of FIG. 3.

As many apparently widely different embodiments of this invention may be made without departing from the spirit and scope thereof, it is to be understood that the invention is not limited to the specific embodiments thereof except as defined in the appended claims.

What is claimed is:

1. In connection with an electric arc furnace used for melting raw materials, an arc furnace transformer and an electric circuit connecting an arc electrode in said arc furnace and the secondary winding of said arc furnace transformer, a method of melting raw materials with an electric arc furnace comprising:
  (a) obtaining the relation between the secondary output power Pi of said arc furnace transformer and the secondary current I flowing to said arc electrode from the secondary winding of said transformer,
  (b) obtaining the relation between the total ohmic loss PL and said secondary current I, said total ohmic loss PL including the ohmic loss of said secondary winding of said transformer and the ohmic loss of said electric circuit connecting said arc electrode and said secondary winding,
  (c) obtaining the constant heat loss qL proper to the body of said arc furnace,
  (d) obtaining the value of said secondary current I of said transformer satisfying the differential equation:

$$d[Pi/(Pi-PL-qL)]/dI=0$$

with use of said secondary output power Pi, said ohmic loss PL and said heat loss qL, and
  (e) feeding the current I of said prescribed value to said arc electrode from said secondary winding of said transformer to strike an electric arc on said arc electrode and make said electric arc melt the raw materials in said arc furnace.

* * * * *